United States Patent
West et al.

(10) Patent No.: US 6,339,434 B1
(45) Date of Patent: Jan. 15, 2002

(54) IMAGE SCALING CIRCUIT FOR FIXED PIXED RESOLUTION DISPLAY

(75) Inventors: Michael G. West; Robert Y. Greenberg; Alan L. Zimmerman, all of Portland, OR (US)

(73) Assignee: Pixelworks, Tualatin, OR (US)

( * ) Notice: Subject to any disclaimer, the term of this patent is extended or adjusted under 35 U.S.C. 154(b) by 0 days.

(21) Appl. No.: 09/198,314

(22) Filed: Nov. 23, 1998

Related U.S. Application Data

(60) Provisional application No. 60/065,445, filed on Nov. 24, 1997, and provisional application No. 60/086,121, filed on May 20, 1998.

(51) Int. Cl.$^7$ .............................. G09G 5/00; H04N 9/74
(52) U.S. Cl. ....................................... 345/667; 348/581
(58) Field of Search ................................ 382/298, 299; 345/127, 131, 132; 348/445

(56) References Cited

U.S. PATENT DOCUMENTS

| | | | |
|---|---|---|---|
| 4,020,332 A | | 4/1977 | Crochiere et al. |
| 4,344,149 A | * | 8/1982 | Van de Meeberg et al. 708/313 |
| 4,612,625 A | * | 9/1986 | Bertrand ...................... 708/313 |
| 4,682,301 A | | 7/1987 | Horiba et al. |
| 5,089,893 A | * | 2/1992 | Iwase ........................ 348/581 |
| 5,285,192 A | | 2/1994 | Johary et al. |
| 5,351,087 A | * | 9/1994 | Christopher et al. ........ 348/441 |
| 5,355,328 A | | 10/1994 | Arbeiter et al. |
| 5,574,572 A | * | 11/1996 | Malinowski et al. ....... 358/451 |
| 5,650,955 A | | 7/1997 | Puar et al. |
| 5,703,806 A | | 12/1997 | Puar et al. |
| 5,767,916 A | | 6/1998 | West |
| 5,790,096 A | | 8/1998 | Hill, Jr. |
| 5,805,233 A | | 9/1998 | West |
| 5,809,182 A | * | 9/1998 | Ward et al. .................. 382/298 |
| 5,892,694 A | * | 4/1999 | Ott ........................... 364/724.1 |
| 6,125,155 A | * | 9/2000 | Lesthievent et al. ........ 375/350 |

\* cited by examiner

Primary Examiner—Jeffery Brier
Assistant Examiner—Ryan Yang
(74) Attorney, Agent, or Firm—Marger Johnson & McCollom, PC

(57) ABSTRACT

An image scaling circuit for increasing or decreasing the size of a sampled image to match a fixed resolution display. The circuit includes means for resizing the image in the horizontal and vertical dimension using independent sample rate converters. The sample rate converters increase or decrease the image size by a factor of Lx/Mx in the horizontal dimension and Ly/My in the vertical dimension where Lx and Ly are integers and Mx and My are decimal numbers of arbitrary precision to provide fine scaling control. In addition, image warping is conveniently implemented by varying the down sample ratios Mx and My on a pixel by pixel and/or line by line basis.

45 Claims, 10 Drawing Sheets

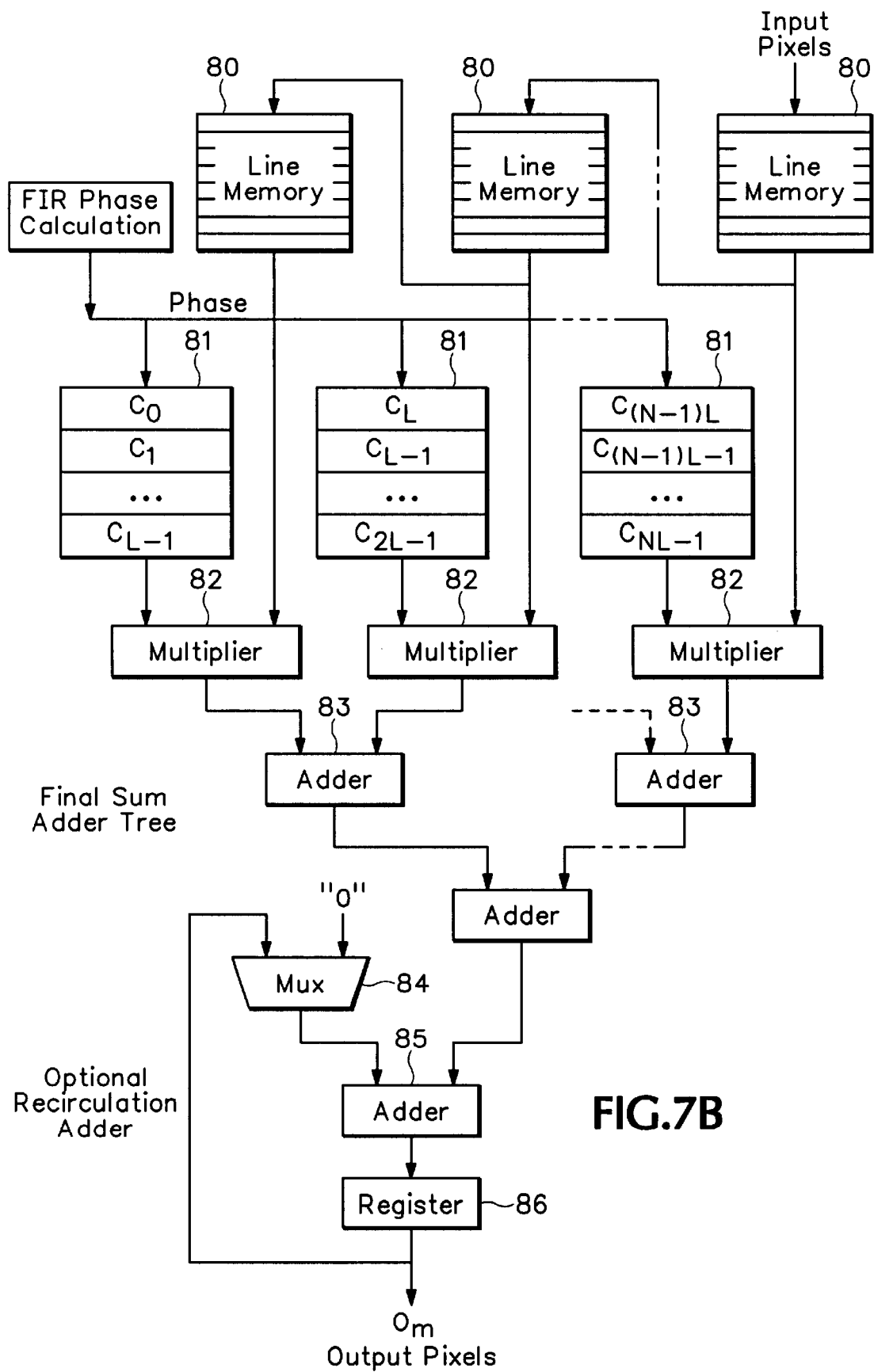

IMAGE SCALING CIRCUIT FOR FIXED PIXED RESOLUTION DISPLAY

This application claims priority from U.S. Provisional Application No. 60/065,445, filed Nov. 24, 1997 and U.S. Provisional Application No. 60/086,121, filed May 20, 1998, which are incorporated herein by reference.

BACKGROUND OF THE INVENTION

1. Field of the Invention

This invention relates to a visual display of digital image data and, more specifically, to methods and circuits for resizing two-dimensional images in either vertical or horizontal or both dimensions, called image scaling, in real time.

2. Description of the Prior Art

Digital image data generally defines one or more frames. A frame is an image displayed for viewing on a display or panel at one time, i.e., a frame of data fits on the display screen or panel. Each frame includes a rectangular array of pixels. Each pixel has one or more values, for example, a gray scale value for a monochrome display or RGB values for a color display. The resolution of the array, i.e., the number of horizontal and vertical pixels, can also be referred to as the image sample rate or resolution. Common display resolutions include those shown in Table 1 indicating the number of pixels in each dimension:

TABLE 1

| VGA | 640 | 480 |
| SVGA | 800 | 600 |
| XGA | 1024 | 768 |
| SXGA | 1280 | 1024 |
| UXGA | 1600 | 1200 |
| HDTV | 1280 | 720 |

Where the resolution or sample rate of the display device matches the resolution of the image data, the data can be displayed directly; if not, it is desirable in many cases that the image be appropriately scaled. Scaling can be done in either vertical or horizontal or both dimensions, and the sample rates can be scaled up or down. Scaling becomes particularly important in connection with pixelated display systems—devices such as liquid crystal display (LCD) projectors, flat panel monitors, PDP, FED, EL, DMD, etc.— that have a fixed pixel structure.

It is generally known that image scaling can be accomplished using sample rate conversion where the sample rate converter scales by a rational number L/M where L and M are positive integers. In this regard, reference is made to U.S. Pat. Nos. 4,020,332, 4,682,301, and 5,355,328. In addition, Schafer and Rabiner, in "A Digital Signal Processing Approach to Interpolation" (Proceedings of the IEEE, Vol. 61, No. 6, pages 692–702, June, 1973), suggest that finite impulse response (FIR) filters with an integer sample rate increase and a integer sample rate decrease can be used to implement a sample rate converter.

U.S. Pat. No. 4,020,332 to Crochiere, et al., describes a means of implementing direct form FIR filters by prearranging the coefficients in a lookup table and sequencing the calculation through these coefficients. The method requires that L and M be integers in order to maintain the fixed coefficient ordering and proper transfer function characteristics. The number of required FIR coefficients is proportionally related to L resulting in a large number of coefficients when fine resampling control is required.

Accordingly, a need remains for improvements in image scaling methods and apparatus. In particular, a need remains for simplifying scaling circuits in order to improve performance and lower cost. A need also remains to provide finer scaling control.

SUMMARY OF THE INVENTION

The present invention includes new methods and apparatus for changing the size of an image represented by a frame of digital data. For example, the dimensions of the frame, typically expressed in pixels, may need to be changed for output to a display device that does not accommodate the dimensions of the original data. With new flat panel display (FPD) technologies emerging as viable alternatives to the cathode ray tube, for example, methods for converting the wide range of image resolutions to match that of a fixed resolution FPD are required. The invention is not merely applicable to individual or still frames. To the contrary, full motion video is a more likely application. While the concepts of resizing graphics data frames are essentially the same for video as for stills, video requires high speed or "real time" operation. To illustrate, a display device might have 1,000 pixels of resolution in both dimensions, for a total of 1 million pixels. To display a video clip of 1 million pixel frames at say, 60 frames per second, requires 60 MHz bandwidth. Accordingly, one object of the present invention is to provide for resizing frames of image data at high speed.

Another aspect of the invention is to improve image resizing by allowing size adjustments by any scaling factor, i.e., by a real number scale factor, as distinguished from prior art solutions that are limited to integer scale factors. The scale factor can be a decimal number of arbitrary precision. Thus, sample rate conversion can be controlled as finely as required. In a presently preferred commercial embodiment of the invention, vertical and horizontal image scaling circuits are independently programmable to provide any scaling factor between $\frac{1}{64}\times$ and $32\times$ although these factors are illustrative rather than critical. Both scaling factors can be changed on a line-by-line or even pixel-by-pixel basis, as further explained below, thereby providing for high-quality image warping.

A further aspect of the invention is to simplify and improve performance of a FIR filter based scaling circuit. Reductions in the required numbers of multipliers and adders contribute to enabling implementation of the new scaling circuits as part of a pixelated display controller ASIC design. Methods and apparatus for implementing these various aspects of the invention are described below after a brief summary of the drawings.

BRIEF DESCRIPTION OF THE DRAWINGS

FIG. 7B is a simplified schematic diagram of a presently preferred embodiment of a sample rate converter for a vertical column of data.

DETAILED DESCRIPTION OF A PREFERRED EMBODIMENT

Figure 1:
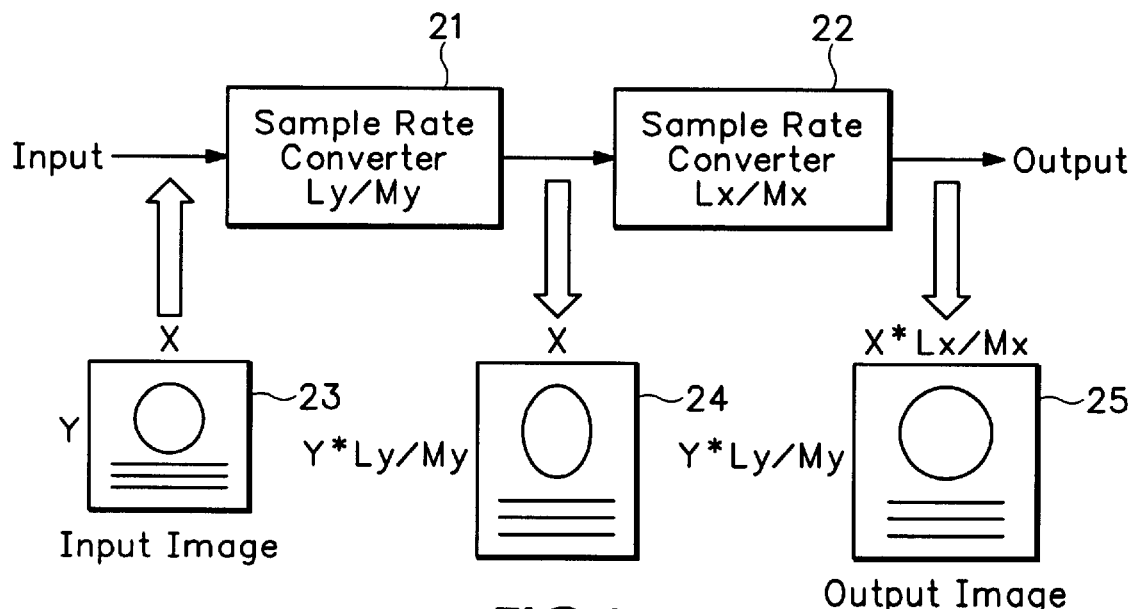
FIG. 1 is a simplified block diagram that illustrates resizing an image up or down using sample rate converters.

FIG. 1 depicts a typical circuit for changing the size of an image using two image scaling circuits or sample rate converters, one for each dimension. Sample rate converter 21 enlarges or reduces the image 23 by a factor of Ly/My in the vertical dimension, producing image 24. Sample rate converter 22 performs the same function in the horizontal dimension, enlarging or reducing image 24 by a factor of Lx/Mx in the horizontal direction producing, in turn, image 25. In the prior art, as noted above, the scale factors Ly, My, Lx, and Mx are integers. According to the present invention, the up sample scale factor Ly is an integer and the down sample scale factor My is a decimal number of arbitrary precision. Likewise in the horizontal dimension, Lx is an integer and Mx is a decimal number of arbitrary precision. The order of the sample rate converters 21 and 22 is interchangeable.

Figure 3:
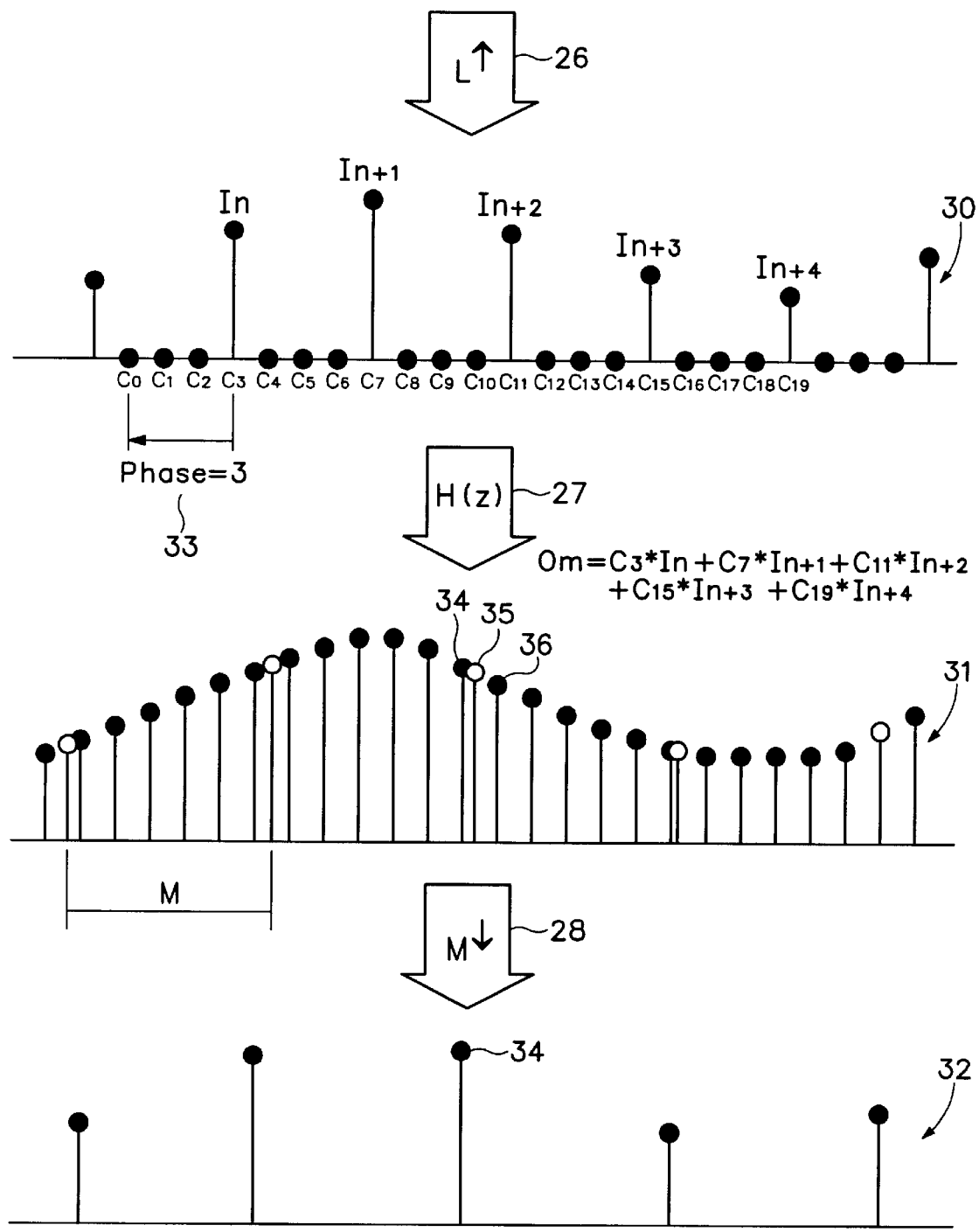
FIG. 3 illustrates the functions of an up sampler, low pass filter, and decimal down sampler according to the present invention.
Figure 4:
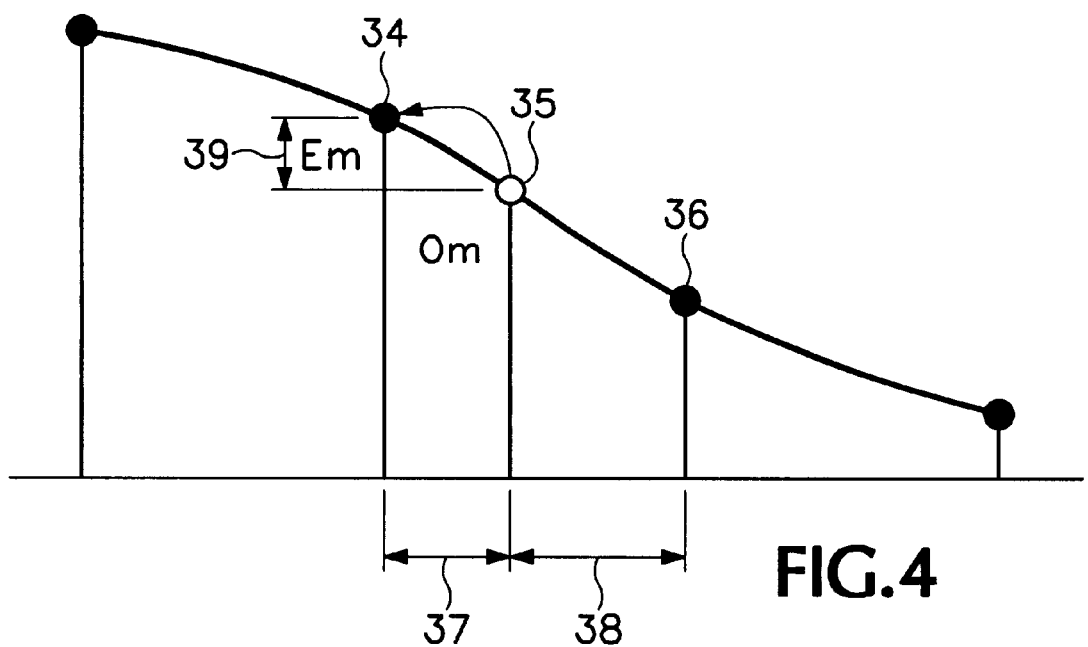
FIG. 4 illustrates the operation of the decimal down sampler and the resulting error terms.

The sample rate converters 21 and 22 shown in FIG. 1 according to the present invention each include an up sampler 26, a low pass FIR filter 27, and a decimal down sampler 28. The up sampler 26 transforms the input coordinate space 29 (a serial stream of pixel data) into an intermediate up sampled space 30 by inserting (L1) zeros as illustrated in FIG. 3. Again referring to FIG. 3, the FIR filter 27 transforms the up sampled data 30 into the interpolated result 31. Every $M_{th}$ value of the interpolated result 31 is selected for output by the down sampler 28. Since M is a decimal number, the desired down sample point may fall between two consecutive points in sequence 31. In FIG. 4, two consecutive points 34 and 36 are shown with the selected output 35 falling in between. The resulting value for 35 is, in the most general case, a function of points 34 and 36. For image processing applications results of sufficient quality are produced by selecting the nearest point based on the smaller of the distance values 37 and 38 (FIG. 4). As a result, the selected output 34 deviates from the output value that would be produce by an FIR system that is restricted to integer down sample rates. The resulting transfer function error terms 39 are equal to the difference in amplitude between 34 and 35. The magnitude of the error term 39 is approximately inversely proportional to the up sample rate L.

Figure 2:
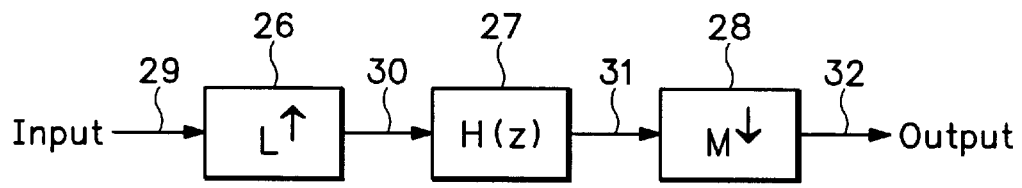
FIG. 2 depicts a multi-rate FIR sample rate converter.
Figure 5:
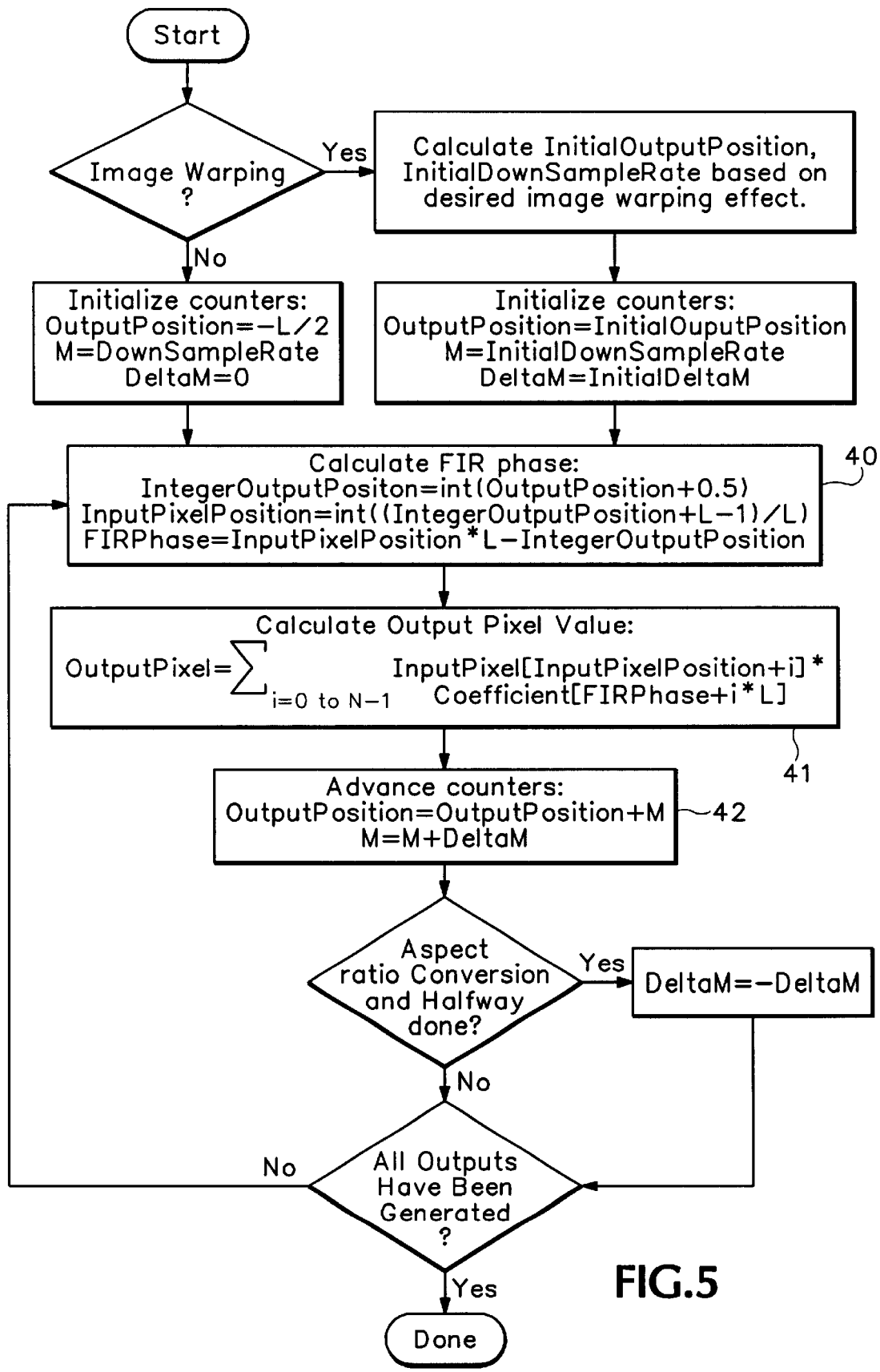
FIG. 5 is a flowchart illustrating a sample rate converter process according to the present invention.

FIG. 5 outlines the sample rate conversion process for the circuits shown in FIGS. 2–4. Step 40 is equivalent to the FIR filter 27 and steps 40 and 42 together represent the up sampler 26 and the down sampler 28. Importantly, the only points of sequence 31 (FIG. 3) that are calculated correspond to actual outputs in sequence 32, that is, all the non-zero points in the sequence 31. As can be seen in the up sampled data 30, each output $O_m$ is only dependent on every $L^{th}$ coefficient of the FIR filter because all other coefficients multiply data values that are zero. Thus, $O_m = C_3 * I_n + C_7 * I_{n+1} + C_{11} * I_{n+2} + C_{15} * I_{n+3} + C_{19} * I_{n+4}$ in FIG. 3. In general, there are L possible sets of coefficients $S_{phase} = \{C_{phase}, C_{phase+L}, C_{phase+2L}, \ldots\}$ for all values of phase in the range 0 to L−1. For a given output, the required coefficient phase and input pixel position can be calculated according to step 40 in FIG. 5, viz:

Calculate FIR Phase
  IntegerOutputPosition=int(OutputPosition+0.5)
  InputPixelPosition=int((IntegerOutputPosition+L−1)/L)
  FIRPhase=InputPixelPosition*L−IntegerOutputPosition Using decimal values of M allows very fine control of the resizing scale factor even when L is a fixed value. In the preferred embodiment $L=2^K$. Limiting the value L to a power of two reduces complexity of the phase calculation process shown in FIG. 5 by replacing the multiplication and division operation in step 40 with a shift-left-by-K operation and a truncate-to-integer operation followed by a shift-right-by-K operation with a zero fill. In addition, the phase calculation is simplified by limiting the length of the FIR filter to N*L where N is an integer and equals the number of multiplication operations required to compute an output result.

Figure 6:
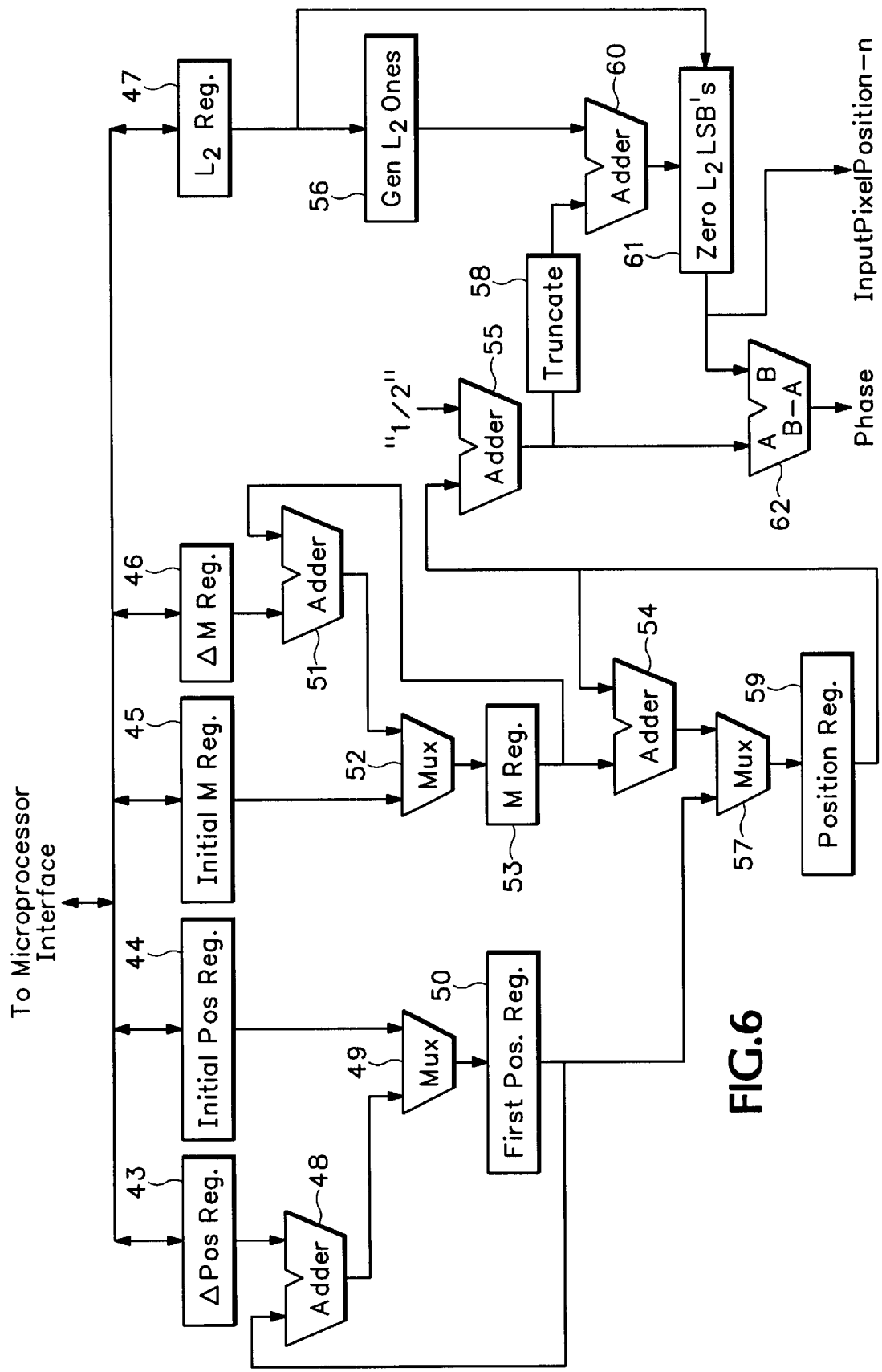
FIG. 6 is a simplified schematic diagram of a presently preferred embodiment of a FIR phase (coefficient memory address) calculation circuit.

The phase calculation circuit described in FIG. 6 generates a new FIR phase and a new input pixel position for each output pixel. Programming the control registers 43 through 47 via the microprocessor interface first initializes the circuit shown in FIG. 6. Once configured the circuit operates independently requiring no further input from the microprocessor (not shown). Once every frame of the image, the contents of register 44 (the initial position) is transferred into register 50 (the first position) by selecting this path on the mux 49. Similarly, the contents of register 45 (the initial down sample or M value) is transferred into register 53 (the current M value) by selecting this path on the mux 52. If image warping is desired, the delta position register 43 will contain a delta position value Δpos that indicates the amount the start position changes each line. The delta position value Δpos is used for image warping, such as keystone correction, and is preferably only implemented in the vertical scaling circuit. Image warping is explained in more detail below with reference to FIGS. 9 and 10. At the beginning of each line in the image, the select control (not shown) on mux 57 is set so that the contents of register 50 (first position register) are transferred into register 59, which determines the current position in the up sample 35 defined by the sequence 31 (FIG. 3). Referring again to FIG. 6, for each output pixel, the contents of position register 59 are advanced by the current down sample increment defined in register 53 (M register) using adder 54. The nearest integer up sample position in sequence 31 is determined by adding ½ to the value of register 59 using adder 55 and then truncating to an integer with truncating circuit 58. The nearest input pixel to the right of sample 35 is found by adding L−1 to the output of truncating circuit 58 using adder 60 and then zero filling $L_2$ least significant bits with circuit 61. Control register 47 specifies the value K, which defines the up sample rate $L=2^K$. The output of circuit 61 is equivalent to the InputPixelPosition*L, as defined above. Finally, the FIR phase is determined by subtracting the output of circuit 61 from the output of adder 55 in a subtraction circuit 62. The FIR phase is used to select a set of filter coefficients, as further explained below, for the terms that contribute (non-zero) to the current output pixel.

Figure 7A:
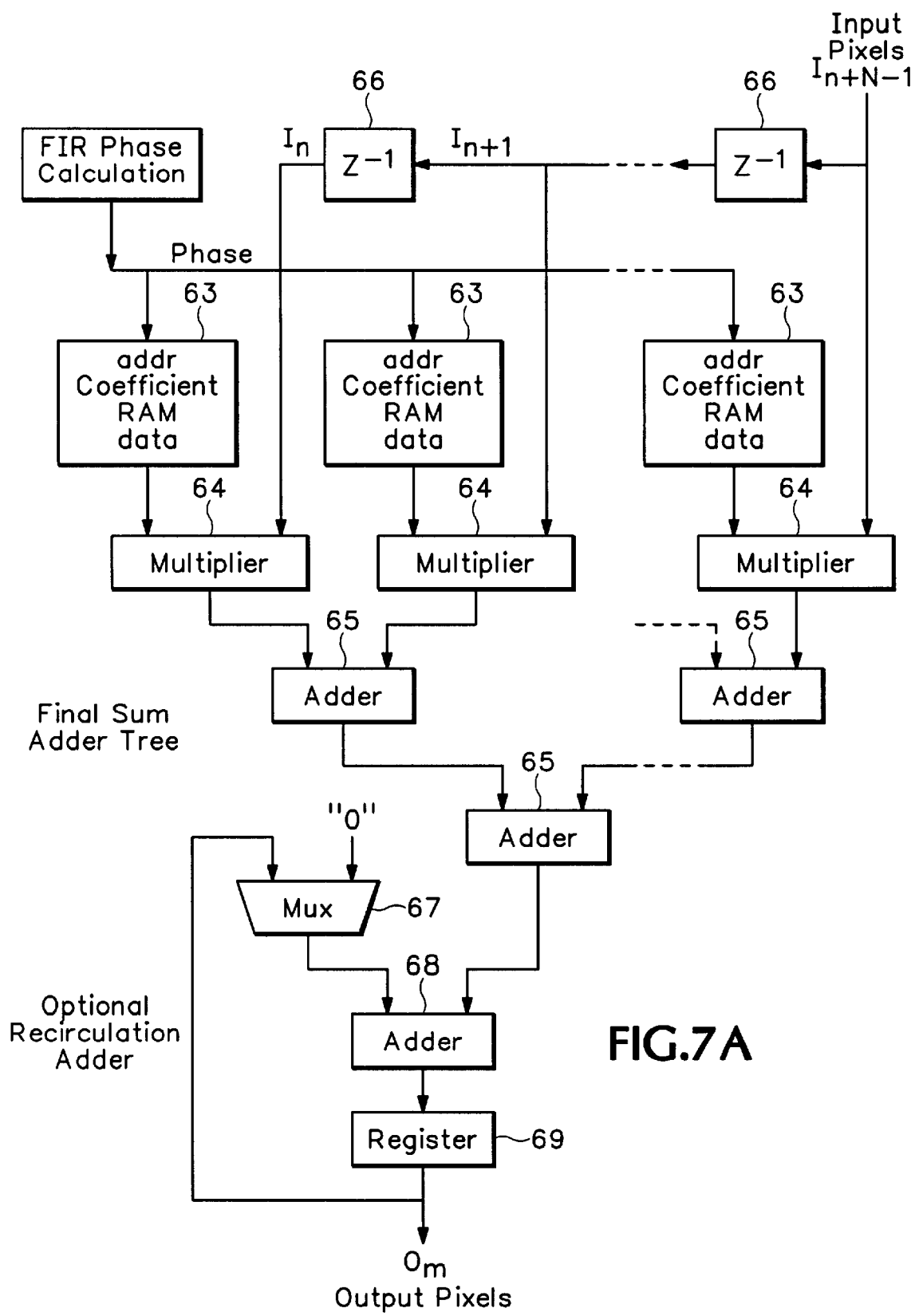
FIG. 7A is a simplified schematic diagram of a presently preferred embodiment of a sample rate converter for a horizontal row of data.

Using the FIR phase and input pixel position defined in FIG. 6, the circuit shown in FIG. 7A calculates the output pixel value for the case of a horizontal scaling circuit or horizontal sample rate converter. The FIR phase is used as an address to fetch coefficients from a coefficient memory, for example, storage RAMs 63. The input pixel position is used to control an input pixel delay line 66 by advancing this pipeline until the required non-zero input pixels are present. The output pixel value is then calculated using multipliers 64 and adders 65. The length of the FIR filter can be increased without using additional multipliers by using an optional recirculation adder 68 that is enabled by selecting the feedback path through multiplexer 67. Since the FIR filter length was restricted to N*L, each coefficient RAM need only contain R*L coefficients of the filter where R is the number of recirculations required to compute the final result.

Likewise, using the FIR phase and input pixel position defined in FIG. 6 the circuit in FIG. 7B calculates the output pixel value for the case of a vertical scaling circuit or vertical sample rate converter. The FIR phase is used as an address to fetch coefficients from a coefficient memory, for example, storage RAMs 81 as described above with reference to FIG. 7B. The input pixel position is used for advancing the line memory buffers 80 or, in the preferred implementation, reading the correct lines directly from memory.

If a line memory buffer 80 is used, each buffer contains the data from a row of data with the nth pixel of each row to be factored available at the same time to a multiplexer. In the preferred embodiment, the nth pixel of each row is read directly from memory. The output pixel value is then calculated using multipliers 82 and adders 83. The length of the FIR filter can be increased using an optional recirculation adder 85 that is enabled by selecting the feedback path on multiplexer 84. Since the FIR filter length was restricted to N*L, each coefficient of RAM need only contain R*L coefficients of the filter where R is the number of recirculations required to compute the final result. In the preferred embodiment of the invention, vertical scaling is performed first, where the nth pixel of a series of rows is factored to produce a single vertical value for these rows. This value is then sent into the pipeline feeding the horizontal scaling circuit.

After a vertical value is calculated, a new phase is calculated that defines the next set of coefficients to use for calculating the next vertical value. The data used for the next vertical value may advance to the next pixel in the rows. For the case of up sampling, since new lines are being created, the same pixels may be used to produce two vertical values for two separate output rows, though the weight each pixel is given will vary as the coefficients have been updated.

Figure 8:
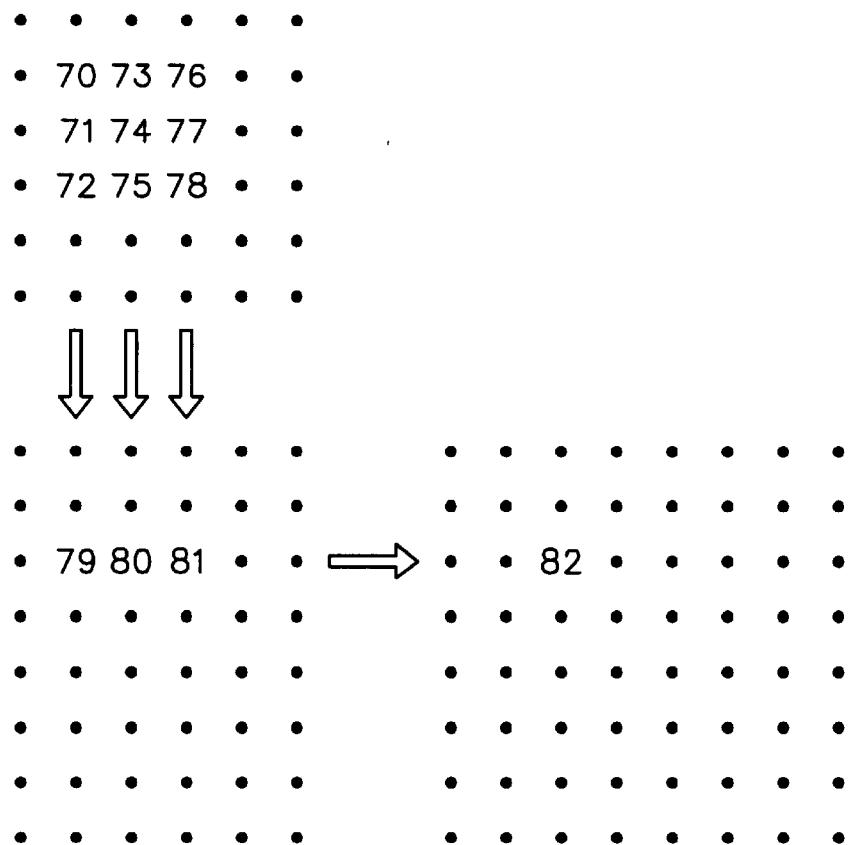
FIG. 8 illustrates one example of mapping of input pixels to output pixels.

FIG. 8 illustrates the relationship of input to output pixels when N=3 (the total number of multipliers). In this case, 9 pixels of the input contribute to the value of each output pixel. The vertical sample rate converter generates pixel 79 from pixels 70, 71, and 72, pixel 80 from pixels 73, 74, and 75, and pixel 81 from pixels 76, 77, and 78. The horizontal sample rate converter then generates pixel 82 from pixels 79, 80, and 81. The low pass filter 27 is designed to have a cutoff that is the smaller of 1/M or 1/L. In the image magnification case where L>M, the cutoff is 2L. Since L is a fixed constant, only one set of coefficients is required. For designs that only require up scaling, these limitations allow for the complexity of the multipliers to be reduced. For designs that require down scaling, programmable filter coefficients are preferred since 1/M determines the cutoff and the value M is not fixed. A significant issue with the design of FIR filters for image processing applications is the filter's response to a constant input. In this case the output is simply the sum of the coefficients for a given phase times the constant input value, i.e., Output=$(C_{phase}+C_{phase+L}+C_{phase+2L}+ . . .)$*Input. If all phases of the FIR filter do not sum to the same value then image patterning will be apparent. To solve this problem each phase of the filter is normalized so that all of the coefficients add up to the same value.

The circuit in FIG. 6 can also support image warping effects, such as keystone correction or aspect ratio conversion. Keystone correction compensates for the widening at the top of an image created when projecting an image from an overhead projector. Turning the projected image from a rectangle into a trapezoid compensates for the keystone effect. Aspect ratio conversion is used on non-linear image conversions where the image is stretched or condensed to the new format more significantly on the outer regions than in the center of the image where the alteration to the image would be more noticeable. For example, if the image is reformatted for a format that is wider, but the same height as the original format, the aspect of the image changes. A stretching effect can be done in a non-linear fashion to preserve the integrity of the center of the image at the expense of the outer portions of the image.

A more general method of image warping involves calculating M as a function of the current output pixel position X,Y (i.e., M=f(X,Y)). For all cases of image warping to prevent aliasing and imaging artifacts, the FIR filter cutoff is the smaller of 1/M' or 1/L where M' is the largest down sample rate used in the image warp, i.e., M'=max(f(X,Y)). Any standard technique for FIR filter design may be used; window methods such a Kaiser, Harris, Hanning, and Hamming work well.

Figure 9:
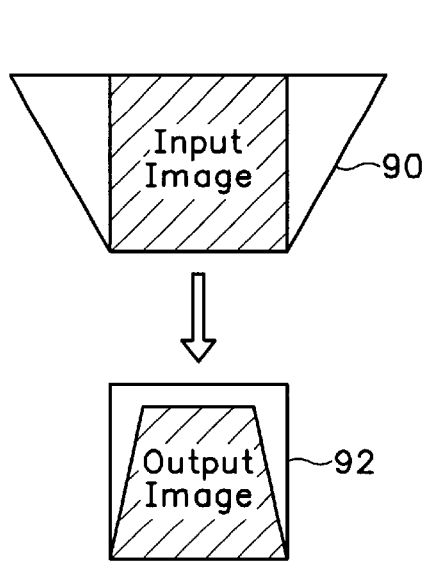
FIG. 9 illustrates the effect of the image warping function when used for keystone correction.

When image warping is used in the present invention, the delta position Δpos in register 43 is non-zero. For each line, the delta position register 43 (FIG. 6) is added to the current first position register 50 to calculate the new first position value. The first position may increase or decrease from line to line based on the narrowing or widening of the keystone effect. The down sample value M may also vary when using image warping effects. A value ΔM is added to the down sample value M stored in register 53 in the feedback loop of adder 51 if the AM value is non-zero. In one of two cases of keystoning—where the output image 92 is as shown in FIG. 9—as fewer input pixels are needed in each successive line, the down sample value M will get smaller because more pixels are skipped at the top than at the bottom. For keystoning, the down sample value M is constant within each line but varies as the lines as consecutively processed. The down sample value M may vary in a variety of different ways, including linearly, non-linearly, and parabolically, or may be determined using a look up table. In the preferred embodiment, the down sample value M is constant within each line but increases or decreases linearly as the lines are consecutively processed. Since the down sample value M may vary only slightly over a high number of lines it is important to have high precision to create a smooth correction. For example, if the down sample value M varies from 2.5 to 2.0 over 1000 lines of data, the keystone rate will change for each line of data by 0.0005. The implemented version of the hardware tracks the precision of the down sample value to 33 bits.

For aspect ratio conversion, the outer regions are distorted, once again needing fewer pixels and a larger M value than in the center of the image. As the pixels are processed toward the center, the down sample value M will decrease until reaching a halfway point. At the halfway point, the value M will again increase.

Figure 10:
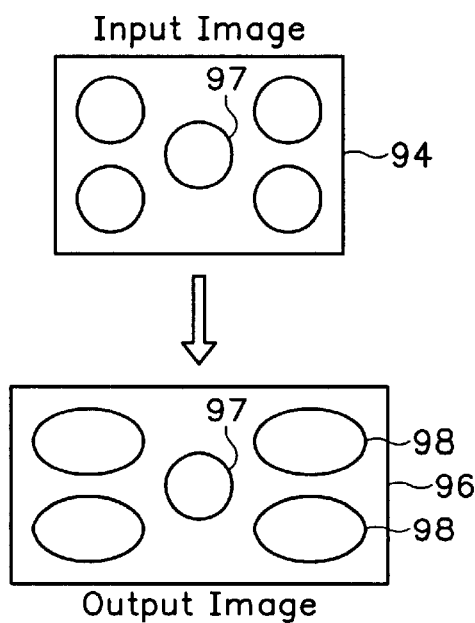
FIG. 10 illustrates the effect of the image warping function when used for aspect ratio conversion.

FIGS. 9 and 10 illustrate two image warping effects that are achieved by varying the decimal down sample value or rate and the scalar starting position as described above. In FIG. 9, keystone correction is illustrated. Keystone correction involves incrementing or decrementing the horizontal down sample value M and start position at each line. The vertical down sample value M is also incremented or decremented each line to preserve the aspect ratio of the image from top to bottom. In the preferred embodiment, the down sample value M is incremented linearly. The following equations can be used to calculate the increment/decrement amounts based on a desired angle of keystone correction.

Definitions $\alpha$=Keystone correction amount (+ or −)

H=Input Image Height

W=Input Image Width $N_x$=Number of horizontal multiplication's (FIR Length= $N_x * L_x$)

$L_{x0}$=Initial horizontal up sample value $M_{x0}$=Initial horizontal down sample value $L_x$=Horizontal up sample value $M_x$=Horizontal down sample value $\Delta M_x$=Horizontal down sample rate line increment $X_0$=Initial horizontal start position $\Delta X$=Horizontal start position line increment $Y_0$=Initial vertical start position $M_{y0}$=Initial vertical down sample value $L_y$=Vertical up sample value $M_y$=Vertical down sample value $\Delta M_y$=Vertical down sample value line increment Equations if $\alpha >= 0$ then $$\Delta M_x = (M_{x0} * \alpha)/((1-\alpha)*(H-1))$$

$$\Delta X = -(L_{x0} * W * \Delta M_x)/(2 * M_{x0})$$

$$X_0 = -(N_x * L_{x0})/2$$

$$M_x = M_{x0} - \Delta M_x * (H-1)$$

$$\Delta M_y = (\alpha * M_{y0}^2)/(H * L_y)$$

$$M_y = M_{y0}$$

$$Y_0 = -(N_y * L_{y0})/2$$

else $$\Delta M_x = -(M_{x0} * \alpha)/((1-\alpha)*(H-1))$$

$$\Delta X = (L_{x0} * W * \Delta M_x)/(2 * M_{x0})$$

$$X_0 = -(N_x * L_{x0})/2 - (H-1) * \Delta X$$

$$M_x = M_{x0} - \Delta M_x * (H-1)$$

$$\Delta M_y = -(\alpha * M_{y0}^2)/(H * L_y)$$

$$M_y = M_{y0} - \Delta M_y * (H-1)$$

$$Y_0 = -(N_y * L_{y0})/2$$

end if.

FIG. 10 illustrates aspect ratio conversion. In this case, the horizontal down sample value M is incremented after each output until the middle of the image is reached. Thereafter, the down sample value is decremented until the end the line. The starting down sample amount and increment/decrement amount are generally set so that near the middle of the image the horizontal resizing ratio L/M is approximately equal to one (assuming no image scaling). As you approach the image edges, the magnification increases as M becomes smaller. Doing so results in correct aspect ratios in the middle and distorted aspect ratios near the edge of the image, i.e., circles remain circles in the middle and become ovals as you approach the edge.

Figure 11:
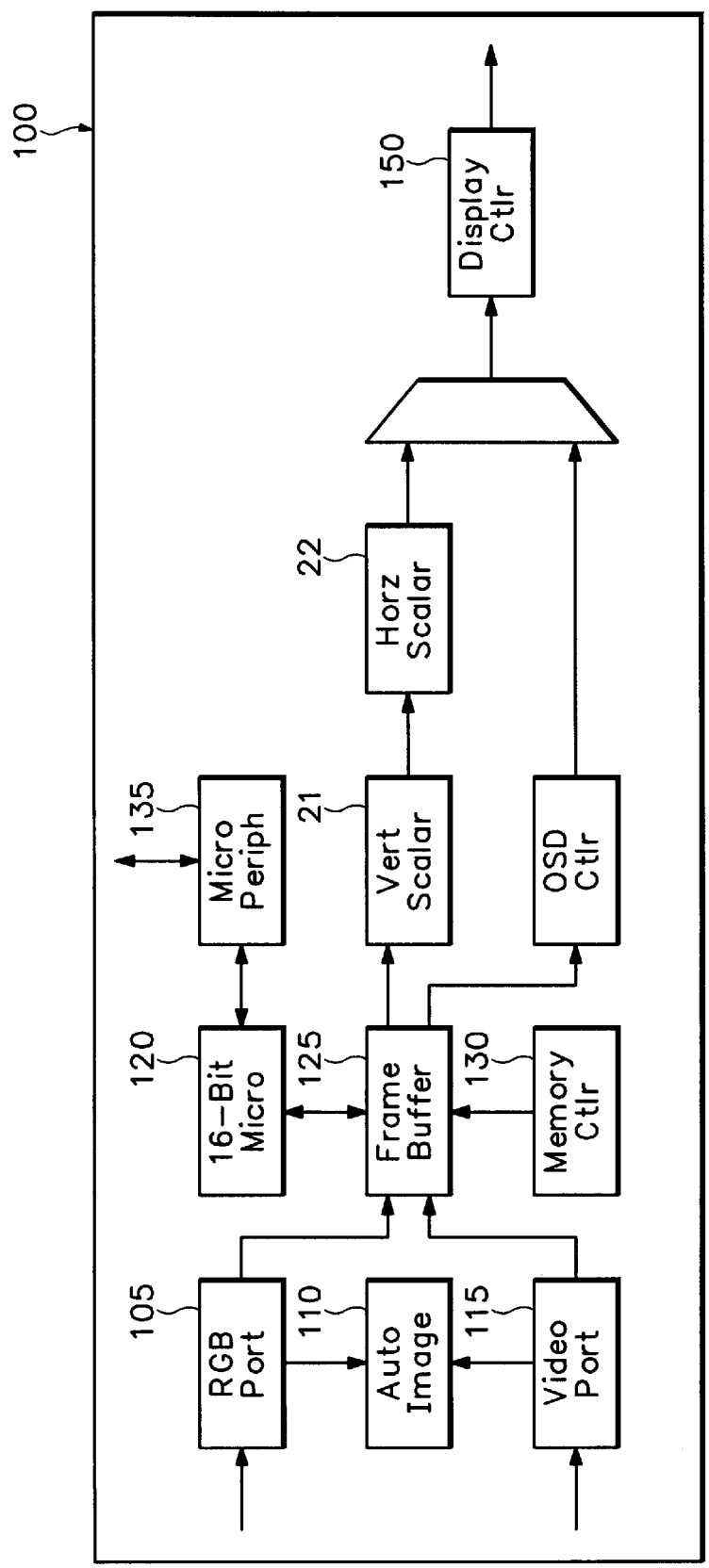
FIG. 11 is a block diagram of a display system controller incorporating the horizontal and vertical sample rate converters shown in FIGS. 7A and 7B.

FIG. 11 is a block diagram of a display system controller 100 incorporating the horizontal and vertical sample rate converters discussed above. Referring to FIG. 11, the display system controller 100 includes an RGB input port 105, video port 115, automatic image optimizer 110, microprocessor 120, frame buffer 125, memory controller 130, microprocessor peripherals 135, on-screen display controller 145, display controller 150, and vertical and horizontal sample rate converters 21 and 22, respectively. The display system controller 100 is preferably implemented on a special-purpose monolithic integrated circuit.

Figure 13:
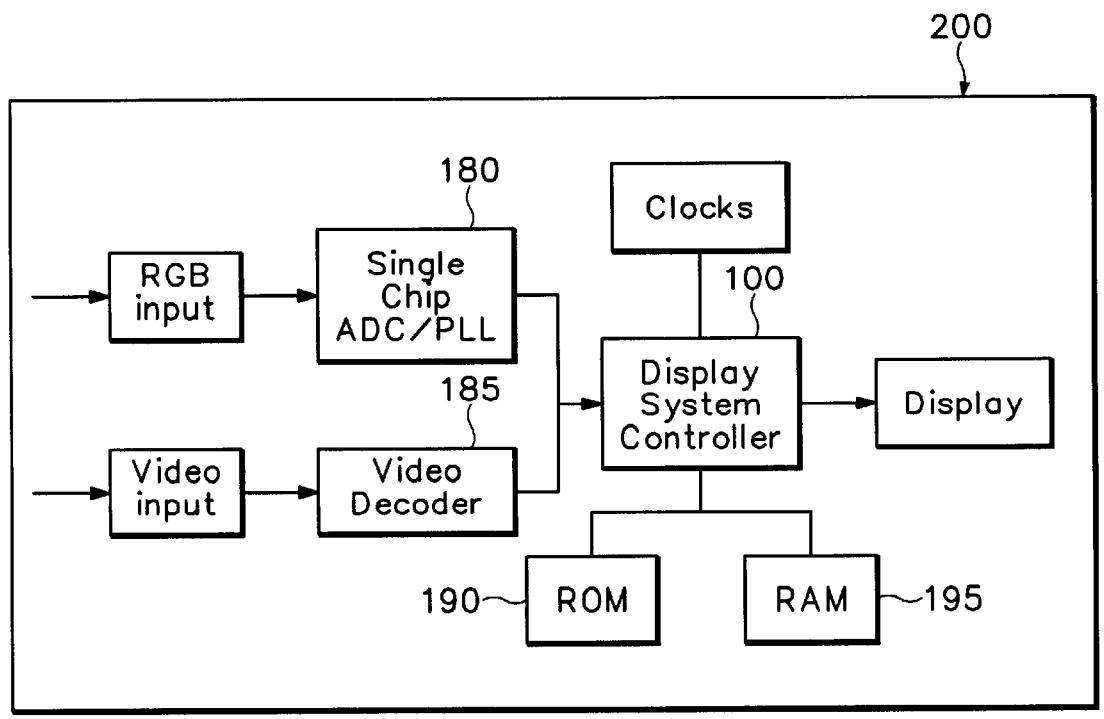
FIG. 13 is a block diagram of a display system incorporating the display system controller shown in FIG. 11.

The RGB input port 105 receives digital data for a pixelated image previously converted from an analog image source (not shown). The preferred RGB port 105 receives data at up to 230 Mpixels/second thereby supporting a variety of display modes up to UXGA. The RGB port 105 receives RGB data having 1 or 2, 24-bit pixels per clock. The RGB port 105 includes a sync processing circuit that can operate from separate, composite, or sync-on-green sync signals. The RGB port 105 supports both interlaced and progressive scanned RGB inputs and half-frequency sampling for lower cost display system implementations. Half-frequency sampling reduces system cost by allowing the use of 100 MHz analog to digital converters—FIG. 13 shows a display system including an analog-to-digital converter 180—while maintaining UXGA image capturing capabilities. Half-frequency sampling involves capturing even pixels on one frame and odd pixels on the following frame.

Figure 12:
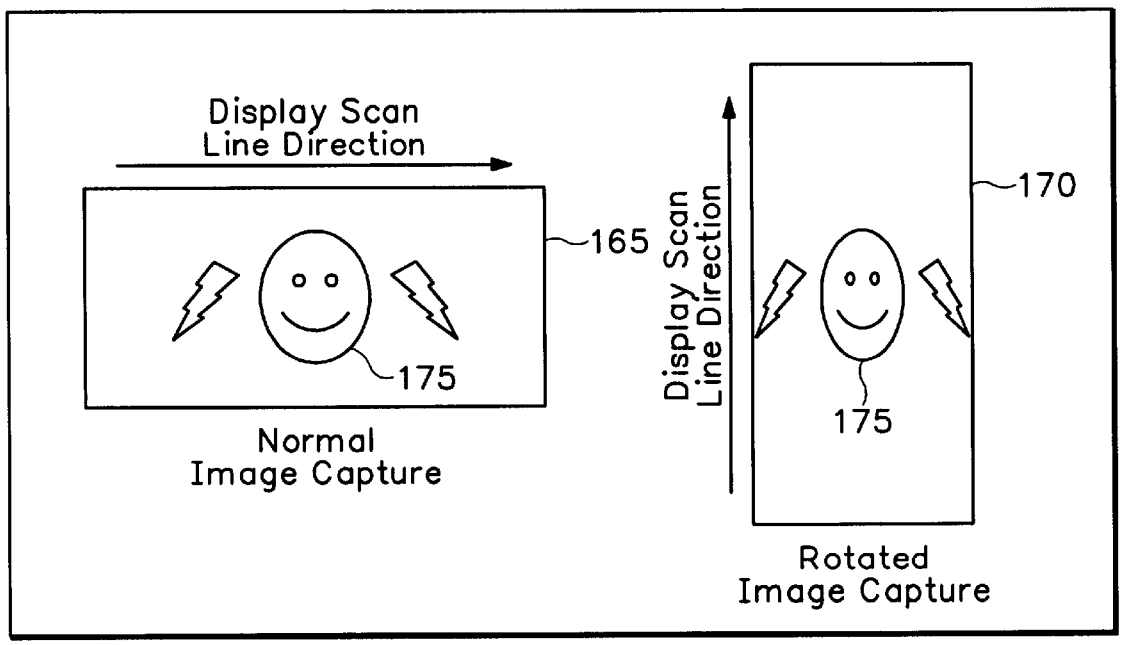
FIG. 12 illustrates rotation of a display from landscape to portrait mode while maintaining the image orientation.

The video port 115 receives YUV or RGB digital data for a pixelated image previously converted from an analog image source (not shown). The video port 115 includes a variety of image processing features including intra-field and inter-field video de-interlacing, double buffered and frame locked image capture modes, and simultaneous signal capture of up to 30 Mpixels/second with RGB input port 105. The video input port 115 includes a rotational feature which allows rotating a received image by 90 degrees. As shown in FIG. 12, this feature allows the display device to be turned from a landscape mode 165 to a portrait mode 170 while displaying the video image 175 in the proper orientation. This 90-degree image rotation is made possible by the high internal memory bandwidth in the display system controller 100. The video port 115 supports all common video decoder integrated circuits. The automatic image optimizer 110 monitors and characterizes the digital input signals received by the RGB port 105 and the video port 115. The automatic image optimizer 110 generates the necessary control signals to allow the RGB port 105 and the video port 115 to interface with the image sources. The control signals include a Phase Locked Loop (PLL) reference signal, a PLL feedback pulse, a PLL coast control signal that disables the PLL during a vertical sync interval, and a Direct Current (DC) restore clamp pulse. The automatic image optimizer 110 sets the clock frequency, the clock phase, and the image size, position, and gain without requiring user intervention. The preferred automatic image optimizer 110 works with a variety of external PLL devices (FIG. 13) to regenerate a pixel sample clock from the video horizontal synchronization signal.

The microprocessor 120 performs all of the control functions necessary for the display system controller 100. The microprocessor 120 is preferably an on-chip general-purpose 16-bit, x86-compatible processor. The microprocessor 120 preferably runs at clock rates of up to 50 MHz and has a one-megabyte address space.

A full complement of microprocessor peripherals 135 are included in the display system controller 100. In the preferred embodiment, the microprocessor peripherals 135 include three 8-bit I/O ports, two 16-bit timers, a watchdog timer, a programmable interrupt controller, an RS-232 serial port, an infrared remote control decoder, a glue-less ROM & RAM interface, and decode logic for external peripherals. The microprocessor peripherals 135 include in the system 100 are on-chip allowing a complete microprocessor system to be implemented by merely adding external read-only and random access memory.

At the heart of the display controller 100 is the embedded frame buffer 125. The main benefit of the frame buffer 125 is frame rate conversion. Frame rate conversion involves converting the refresh rate of the input signal to accommodate the limited refresh rate range of many displays. Thus, the frame buffer 125 allows the refresh rate of the input signal to be different than the refresh rate of the output signal. For example, the input signal received from a typical personal computer graphics card varies from 60 Hz to 100 Hz while the display device may require an output signal having a fixed 60 Hz refresh rate. Input signals having resolutions of up to XGA can be double buffered or frame dropped, i.e., inhibit the capture of frames for a limited time, to eliminate frame tear when the input and display refresh rates are different. The frame buffer 125 includes an intelligent image compression feature and an interlaced RGB image capture feature. The intelligent image compression feature compresses image pixels from 24 bits per pixel down to 16 bits per pixel with negligible loss of image quality. The frame buffer 125 supports the half-frequency RGB image capture feature of the automatic image optimizer 110. The frame buffer 125 includes sufficient memory storage for on screen display (OSD) bitmaps. Because of the high bandwidth internal buses resident in the system 100, the frame buffer 125 can capture input signals received at the RGB port 105 and the video port 115 simultaneously as well as display the OSD.

The frame buffer 125 preferably contains 32 Mbits of high-speed synchronous dynamic random access memory (SDRAM) with a 256-bit internal data bus. The buffer can store up to SXGA (1280×1024) images at 24 bits per pixel or UXGA (1600×1200) or HDTV (1920×1080) images at 16 bits per pixel.

The memory controller 130 arbitrates access to the frame buffer 125 from other subsystems within the display system controller 100 including the RGB input port 105, the video input port 115, the OSD controller 145, the microprocessor 120, and the vertical and horizontal sample rate converters 21 and 22, respectively. The memory controller 130 dynamically allocates the available memory bandwidth to ensure that the instantaneous pixel bandwidth requirement of each functional unit is met. The memory controller 130 abstracts the physical storage arrangement of data in the frame buffer 125, which is optimized to maximize memory bandwidth. The subsystems request memory access with logical addresses that are translated to physical memory addresses within the memory controller 130. In the currently preferred embodiment, up to five different subsystems can access the frame buffer 125 simultaneously.

The vertical and horizontal sample rate converters 21 and 22, as mentioned above, scale the captured image up or down to any arbitrary resolution. Vertical and horizontal scale factors are completely independent. The sample rate converters 21 and 22 allow a wide range of captured image resolutions to be displayed on a fixed pixel resolution display device. For example, in the case of an XGA LCD desktop monitor, the sample rate converters 21 and 22 can be used to perform the following resizing factors:

NTSC up to XGA
VGA up to XGA
SVGA up to XGA
XGA to XGA (no scaling)
SXGA down to XGA
UXGA down to XGA
HDTV down to XGA The display system controller 100 includes an OSD controller 145. The OSD controller 145 fills and draws OSD bitmaps into the frame buffer 125. An overlay function included in the OSD controller 145 allows transparent and semi-transparent overlays to be displayed. The OSD controller 145 selects on a pixel-by-pixel basis whether to display the scaled, captured image or the OSD bitmap stored in the frame buffer 125. The OSD controller 145 can be used to implement simple, opaque, character-based menu systems or complex, bitmap-based, menus with transparent backgrounds. Advanced functions such as a translucent highlighter pen and embossed transparent logos are also possible. The OSD controller 145 preferably supports up to 16 bits per pixel or 64K colors.

The display controller 150 generates timing signals to control the pixelated output display device. The display timing is fully programmable and is completely independent of the image being captured. The display controller 150 supports display refresh rates between about 50 Hz to over 100 Hz. The displayed image may be flipped horizontally or vertically. The display controller 150 includes a color space expander that allows full color display on displays with fewer than 8-bits per color channel. Programmable color lookup tables are provided to allow for gamma correction, i.e., matching the display's color space to the desired range. Gain and contrast controls are also included in the controller 150. Single and dual pixel outputs are supported at up to UXGA (1600×1200) resolution.

The display system controller 100 includes a variety of circuits that support unique features not shown in FIG. 11. For example, a picture-in-picture feature allows the input image received at the video port 115 to be simultaneously displayed in the same window as the input image received at the RGB port 105. The captured image can also be panned and zoomed by the user. Additionally, an average picture level (APL) monitoring circuit allows monitoring the overall brightness of the pixels sent to the display.

FIG. 13 illustrates a typical system configuration for a flat panel monitor using the display system controller 100 shown in FIG. 11. The system 200 includes an analog-to-digital (ADC) converter or phase locked loop (PLL) circuit 180 for receiving the RGB analog input signal from an image source (not shown). The ADC/PLL circuit converts the analog input signal to a digital signal and provides the digital signal to the display system controller 100. A video decoder 185 receives an analog video image from an analog video source (not shown). Read-only and random access memories 190 and 195, respectively, are coupled to the display system controller 100 and store bitmaps, FIR filter coefficients, and the like.

Having illustrated and described the principles of our invention, it should be readily apparent to those skilled in the art that the invention can be modified in arrangement and detail without departing from such principles. We claim all modifications coming within the spirit and scope of the accompanying claims.

What is claimed is:

1. A sample rate converter circuit for processing digital image data to resize a corresponding image, the sample rate converter circuit comprising: input means for receiving an input stream of pixel values having a first sample rate;
   an up sampler means for increasing the sample rate of the input stream to form an intermediate sample stream responsive to the input stream and having an up sample rate greater than the first sample rate;
   FIR filter means for filtering the intermediate sample stream to form a FIR filtered intermediate sample stream; and
   a down sampler means for decreasing the sample rate of the FIR filtered intermediate sample stream to form an output sample stream having a down sample rate less than the up sample rate wherein the down sampler means is arranged to reduce the sample rate of the intermediate sample stream by a down sampling factor, the down sampling factor being a selected decimal number of arbitrary precision.

2. A sample rate converter according to claim 1 wherein the up sampler means is arranged to increase the up sample rate by a selected integer factor.

3. A sample rate converter according to claim 2 wherein the integer factor is a power of two.

4. A sample rate converter circuit for processing digital image data to resize a corresponding image, the sample rate converter circuit comprising:
   input means for receiving an input stream of pixel values having a first sample rate;
   an up sampler means for increasing the sample rate of the input stream to form an intermediate sample stream responsive to the input stream and having an up sample rate greater than the first sample rate;
   FIR filter means for filtering the intermediate sample stream to form a FIR filtered intermediate sample stream; and
   a down sampler means for decreasing the sample rate of the FIR filtered intermediate sample stream to form an output sample stream having a down sample rate less than the up sample rate wherein the down sampler means is arranged to reduce the sample rate of the intermediate sample stream by a selected decimal factor;
   wherein the down sampler means includes means for selecting the decimal factor by selecting one of an adjacent pair of samples of the FIR filtered intermediate sample stream as an output sample value.

5. A sample rate converter according to claim 1 wherein the down sampler includes means for determining an output sample value responsive to values of an adjacent pair of samples of the FIR filtered intermediate sample stream.

6. A sample rate converter according to claim 5 including means for selecting one of an adjacent pair of samples of the FIR filtered intermediate sample stream and means for interpolating between the values of the selected adjacent pair of samples of the intermediate sample stream to form the output sample value.

7. A sample rate converter according to claim 1 including an image warping means for scaling the digital image data so as to produce an output image that is warped in relation to an input image.

8. A sample rate converter according to claim 7 wherein the image warping means includes means for varying the up sample rate or the down sample rate or both.

9. A sample rate converter according to claim 8 wherein the down sample rate is constant within each line and varies linearly from line to line of the output sample stream to create an output image having a keystone effect relative to the pixelated image.

10. A sample rate converter according to claim 8 wherein the down sample rate varies within each line of the output sample stream to create an output image having an aspect ratio different than an aspect ratio of the input image.

11. A sample rate converter circuit for processing digital image data to modify the sample rate of a corresponding pixelated image, the sample rate converter circuit comprising:
    an input buffer for receiving an input stream of pixel values having a first sample rate;
    an up sampler circuit for increasing the sample rate of the input stream by an integer up sample factor L so as to form an intermediate sample stream responsive to the input stream and having an intermediate sample rate equal to L times the first sample rate;
    a FIR filter for low-pass filtering the intermediate sample stream to form a FIR filtered sample stream; and
    a down sampler circuit for decreasing the sample rate of the FIR filtered sample stream by a selected decimal down sample factor M so as to form an output sample stream having an output sample rate equal to 1/M times the intermediate sample stream sample rate whereby the output sample rate is equal to L/M times the first sample rate.

12. A sample rate converter circuit according to claim 11 wherein the up sample factor L is a power of two.

13. A sample rate converter circuit according to claim 11 wherein:
    the FIR filter includes a plurality of multiplier circuits, each multiplier circuit arranged to multiply a selected input pixel value by a selected FIR coefficient to form a respective product; and
    the FIR filter includes an adder arranged for summing the products together to calculate an output pixel value.

14. A sample rate converter circuit according to claim 13 wherein the plurality of multipliers are integer multipliers.

15. A sample rate converter circuit according to claim 13 wherein the input buffer comprises a pipeline formed of unit delay elements and wherein the input buffer comprises a plurality of taps, each tap connecting a respective one of the delay elements to an input of a corresponding one of the multiplier circuits for providing the selected input pixel value to the corresponding one of the multiplier circuits.

16. A sample rate converter circuit according to claim 13 wherein the input buffer comprises a pipeline of line memory buffers and wherein the input buffer comprises a plurality of taps, each tap connecting a respective one of the line memory buffers to an input of a corresponding one of the multiplier circuits for providing the selected input pixel value to the corresponding one of the multiplier circuits.

17. A sample rate converter circuit according to claim 13 wherein the FIR filter has a length equal to L*N, where L is the integer up sample factor and N is a selected integer.

18. A sample rate converter circuit for processing digital image data to modify the sample rate of a corresponding pixelated image, the sample rate converter circuit comprising:
    an input buffer for receiving an input stream of pixel values having a first sample rate;
    an up sampler circuit for increasing the sample rate of the input stream by an integer up sample factor L so as to form an intermediate sample stream responsive to the input stream and having an intermediate sample rate equal to L times the first sample rate;

a FIR filter for low-pass filtering the intermediate sample stream to form a FIR filtered sample stream; and a down sampler circuit for decreasing the sample rate of the FIR filtered sample stream by a selected decimal down sample factor M so as to form an output sample stream having an output sample rate equal to 1/M times the intermediate sample stream sample rate whereby the output sample rate is equal to L/M times the first sample rate;

a memory for storing one or more sets of coefficients, each set of coefficients corresponding to a respective FIR phase; and an FIR phase calculation circuit for determining a subset of input pixels and a corresponding FIR phase for each input pixel of the subset of input pixels;

wherein the FIR filter includes a plurality of multiplier circuits, each multiplier circuit arranged to multiply a selected input pixel value by a selected FIR coefficient to form a respective product; and wherein the FIR filter includes an adder arranged for summing the products together to calculate an output pixel value.

19. A sample rate converter circuit according to claim 18 wherein each set of coefficients includes only coefficients corresponding to non-zero terms of the intermediate sample stream.

20. A sample rate converter circuit according to claim 18 wherein the FIR phase calculation circuit includes an image warping circuit for scaling the pixelated image by varying the up sample factor L or the down sample factor M or both.

21. A sample rate converter circuit according to claim 20 wherein the down sample factor M is constant within each line and varies linearly from line to line of the pixelated image to create an output pixel image having a keystone effect relative to the pixelated image.

22. A sample rate converter circuit according to claim 20 wherein the down sample factor M varies within each line of the pixelated image to create an output image having an aspect ratio different than an aspect ratio of the pixelated image.

23. A pixelated display controller integrated circuit, comprising:

a vertical scalar circuit; and a horizontal scalar circuit, the vertical and horizontal scalar circuits together forming a two-dimensional image scaling subsystem;

wherein each of the vertical and horizontal scalar circuits comprises a multi-rate FIR filter system, each multi-rate FIR filter system comprising an up sampler circuit, a low-pass FIR filter, and a down-sampler circuit, wherein at least one of the up sampler circuits has an up sampling factor of L; and wherein the down-sampler circuit corresponding to said one of the up sampler circuits has a down sampling factor of M, where M is a decimal number, whereby at least one of the vertical and horizontal scalar circuits provides a rational scaling factor equal to L/M.

24. A pixelated display controller system according to claim 23 wherein each low-pass FIR filter has a cutoff frequency approximately equal to the smaller of 1/M and 1/L.

25. A pixelated display controller system according to claim 23 wherein $L=2^n$ and n is a positive integer.

26. A pixelated display controller system according to claim 23 wherein M is represented as a 16-bit real number.

27. A pixelated display controller system according to claim 23 wherein the controller system is implemented in a monolithic integrated circuit.

28. A pixelated display controller system according to claim 23 wherein the vertical and horizontal scalar circuits implement scaling factors of Ly/My and Lx/Mx respectively, where Lx and Ly are powers of two and Mx and My are decimal numbers.

29. A sample rate converter according to claim 23 including an image warping means for scaling digital input image data so as to produce an output image that is warped in relation to an input image.

30. A sample rate converter according to claim 29 wherein the image warping means includes means for varying the up sample factor L or the down sample factor M or both.

31. A sample rate converter according to claim 30 wherein the down sample factor M is constant within each line and varies linearly from line to line of the output sample stream to create an output image having a keystone effect relative to the pixelated image.

32. A sample rate converter according to claim 30 wherein the down sample factor M varies within each line of the output sample stream to create an output image having an aspect ratio different than an aspect ratio of the input image.

33. A pixelated display controller system according to claim 23 including a frame buffer coupled to either the vertical or horizontal scaling circuits for storing pixelated images.

34. A pixelated display controller system according to claim 33 wherein the frame buffer converts an input refresh rate to an output refresh rate.

35. A pixelated display controller system according to claim 33 wherein the frame buffer includes synchronous dynamic random access memory.

36. A pixelated display controller system according to claim 35 wherein the frame buffer includes synchronous dynamic random access memory sufficient to store up to SXGA images at 24 bits per pixel or UXGA/HDTV images at 16 bits per pixel.

37. A method for rationally scaling a digital image having a series of digital image pixel values in a FIR filter scaling circuit, the method comprising:

receiving a series of input pixel values Ix;

selecting an up sample factor L, the up sample factor being a power of 2;

selecting a down sample factor M, the down sample factor M being a decimal number of arbitrary precision;

sizing the FIR filter scaling circuit as an integer multiple N times L so that the number of non-zero multiplies to realize the filter is N with every Lth filter coefficient multiplying a non-zero input pixel value;

selecting a group of non-zero input pixel values;

identifying a set of FIR filter coefficients for the group of non-zero input pixel values that multiply respective non-zero input pixel values in the FIR filter;

multiplying the group of input pixel values by the identified coefficients to form N products;

calculating a value of the initial output pixel position as a sum of the N products, whereby the number of multiply operations in the filter is reduced to N rather than N*L; and repeating the selecting, identifying, multiplying, and calculating steps for subsequent output pixel positions so as to form a series of scaled output pixel values responsive to the series of input pixel values.

38. A method for rationally scaling a digital image having a series of digital image pixel values in a FIR filter scaling circuit, the method comprising:

receiving a series of input pixel values Ix;

selecting an up sample factor L, the up sample factor being a power of 2;

selecting a down sample factor M, the down sample factor M being a decimal number of arbitrary precision;

sizing the FIR filter scaling circuit as an integer multiple N times L so that the number of non-zero multiplies to realize the filter is N with every Lth filter coefficient multiplying a non-zero input pixel value;

selecting a group of non-zero input pixel values;

identifying a set of FIR filter coefficients for the group of non-zero input pixel values that multiply respective non-zero input pixel values in the FIR filter;

multiplying the group of input pixel values by the identified coefficients to form N products;

calculating a value of the initial output pixel position as a sum of the N products, whereby the number of multiply operations in the filter is reduced to N rather than N*L; and repeating the selecting, identifying, multiplying, and calculating steps for subsequent output pixel positions so as to form a series of scaled output pixel values responsive to the series of input pixel values;

wherein identifying a set of FIR filter coefficients includes calculating a FIR phase and using the FIR phase to select one of a plurality of predetermined sets of coefficients.

39. A method for rationally scaling a digital image according to claim 38 wherein identifying a set of FIR filter coefficients includes storing the FIR coefficients in a memory and addressing the memory using the calculated FIR phase to access the selected set of coefficients.

40. A method for rationally scaling a digital image according to claim 38 wherein calculating the FIR phase includes:

defining a coefficient array as h(i) for i=0 to L*N−1;

determining an integer output position by truncating a current output position plus 0.5;

determining an integer input pixel start position by truncating the integer output position plus L minus one divided by L; and calculating the FIR phase as the input pixel start position*L minus the output position.

41. A method for rationally scaling a digital image according to claim 38 comprising normalizing each set of coefficients so that a sum of the coefficients for each set is equal to a predetermined constant whereby the FIR filter response to a constant input pixel value is a constant output.

42. A method for rationally scaling a digital image according to claim 38 including scaling the digital image to produce a scaled output image.

43. A method for rationally scaling a digital image according to claim 42 wherein scaling the digital image includes applying a keystone effect to the digital image by maintaining the down sample factor M constant within a line of the digital image and linearly varying the down sample factor M on a line by line basis.

44. A method for rationally scaling a digital image according to claim 42 wherein scaling the digital image includes converting an aspect ratio of the digital image to an aspect ratio of the output image, the aspect ratio of the digital image being different than the aspect ratio of the output image.

45. A method for rationally scaling a digital image according to claim 44 wherein converting the aspect ratio includes varying the down sample factor M of the digital image on a pixel by pixel basis.

* * * * *

UNITED STATES PATENT AND TRADEMARK OFFICE
CERTIFICATE OF CORRECTION

PATENT NO. : 6,339,434 B1  Page 1 of 1
DATED : January 15, 2002
INVENTOR(S) : West et al.

It is certified that error appears in the above-identified patent and that said Letters Patent is hereby corrected as shown below:

Title page,
Item [54], Title, "PIXED" should read -- PIXEL --.

Column 3,
Line 43, "(L1)" should read -- (L-1) --.
Line 45, "$M_{th}$" should read -- $M^{th}$ --.

Column 5,
Line 61, "2L" should read -- 1/L --.

Column 6,
Line 42, "AM" should read -- $\Delta M$ --.

Signed and Sealed this

Sixteenth Day of December, 2003

JAMES E. ROGAN
*Director of the United States Patent and Trademark Office*